Patented Jan. 23, 1945

2,367,738

UNITED STATES PATENT OFFICE 2,367,738

X-RAY PROTECTIVE COMPOSITION

Durant W. Robertson, Montclair, and Joseph A. Breckley, Mountain Lakes, N. J., assignors to National Lead Company, New York, N. Y., a corporation of New Jersey No Drawing. Application April 29, 1942, Serial No. 440,982

3 Claims. (Cl. 250—108)

This invention relates to compositions which are useful for the absorption of and protection against penetrating electromagnetic rays, and it relates particularly to so-called X-ray protective compositions.

Dangerous physical effects such as burns and anemia may result from exposure to X-rays. It is therefore necessary wherever X-rays are used to provide certain protective media for the absorption of these rays. Many materials will, if used in sufficiently heavy layers, provide adequate protection against X-rays, but of the more readily available materials lead stands out as being by far the best for protective purposes. Lead has thus extensively been used in the form of lead sheet or in the form of atomized lead incorporated into rubber to form the so-called X-ray rubber. In the latter case a protective medium is obtained which also has flexibility.

The absorptive power of lead in respect to X-rays is substantially the same whether the lead is used in the metallic state or in the form of a compound, the absorption property of the compound being substantially in proportion to the lead content thereof, with allowances made for the absorptive properties of the other elements of the compound.

Among compositions containing lead which may be used for protection against X-rays may be mentioned lead glass which essentially is a fused lead silicate. However, lead glass is not universally employed as an absorptive medium for X-rays mainly because it is non-flexible and breakable.

Of other readily available elements which provide good protection against X-rays, although not comparable to that of lead, may be mentioned barium which has been used in the form of barium sulfate plaster.

Atomized lead has also been widely used in X-ray protective compositions but has not proved entirely satisfactory because of the high reactivity of the atomized lead and because of the black appearance imparted by it to the protective composition. Thus X-ray rubber compounded with atomized lead is almost black due to the dark color of the lead itself and to the presence of lead sulfide which is formed during the compounding of the rubber by reaction between the finely-divided lead and the sulfur of the rubber compound.

It is the object of the present invention to overcome the objectionable features of prior art X-ray protective compositions. It is a further object to prepare an X-ray rubber of lighter color than prior art X-ray rubber products and which permits of tinting to various colors. Another object is the preparation of an X-ray rubber composition the filler of which is in a higher degree of subdivision than atomized lead thus giving a more homogeneous product. A still further object is the preparation of an X-ray rubber containing a lead compound which is comparatively nonreactive towards the sulfur of the rubber compound. Other objects will become apparent as the description of the invention proceeds.

Broadly the present invention comprises the preparation of X-ray protective compositions compounded with a lead compound which is comparatively nonreactive. In a more restricted sense this invention comprises X-ray protective compositions, e. g., X-ray rubber and X-ray plaster screens, containing lead titanate.

It has been stated above that the degree of X-ray absorption possessed by materials containing lead, either as metallic lead or in the form of a lead compound, is substantially proportionate to the amount of lead present, with allowances made for the absorptive powers of the other elements of the compound, i. e., one unit area of a lead sheet, or of an X-ray rubber sheet containing atomized lead, or of an X-ray rubber prepared with, for example, lead titanate, will possess substantially equal absorptive properties toward X-rays provided the content of the Pb in each unit area is the same. Thus, a unit area of lead sheet weighing 1.0 gram and a unit area of atomized lead rubber containing 1.0 gram of Pb and a unit area of rubber sheet containing 1.39 grams of lead titanate corresponding to 1.0 gram of Pb, will have substantially equal absorptive powers toward X-rays. One may, therefore, by loading the rubber with correspondingly larger amounts of lead compound or by using a thicker rubber sheet, obtain any desired degree of X-ray protection equal to that which is possible when using lead sheet or ordinary X-ray rubber containing atomized lead.

The novel X-ray rubber compositions of the present invention may be prepared by following any conventional procedure used in the compounding of rubber. Crude rubber may be admixed with the required amount of vulcanizing agents and the calculated amount of lead titanate and the mixture then cured in the usual manner by heat treatment.

While the foregoing description should be adequate for anyone skilled in the art to practice the present invention, the following data will serve to give a more detailed illustration of one of the methods used in preparing the novel X-ray rubber compositions of the present invention, as well as to describe the method used in determining their X-ray absorptive properties.

Example

A master rubber batch was first prepared by mixing:

| | Parts |
|---|---|
| Pale crepe rubber | 100 |
| Sulfur | 2 |
| Zinc oxide | 5 |
| "Ureka C"—which is a trade name for a benzothiazylthiobenzoate accelerator | 0.5 |
| "Thionex"—which is a trade name for a tetramethylthiurammonosulfide accelerator | 0.1 |

Four samples respectively designated in the table below as A, B, C, and D, were prepared from the master batch with a pigmentary grade lead titanate, containing a minor amount of lead sulfate. The amount of filler was varied from about 70 percent by weight to 90.0 percent calculated on the final product. No difficulty was experienced in incorporating the lead titanate into the rubber composition.

Sheets of about 0.1″ in thickness were vulcanized at 274° F. for 30 minutes.

All four samples which were of a light gray color, were tested for X-ray penetration together with a commercial X-ray rubber (atomized lead) and three lead sheets of 0.015″, 0.020″ and 0.025″ thickness respectively.

The tests were carried out in the following manner:

Small squares of the respective sheets, about 1 square inch in size, were placed over a dental film (Eastman Dental Radiotized) and exposed to the X-radiation for equal periods of time. The films were then developed and the degree of X-ray penetration judged by comparing the films in respect to darkening.

The X-ray tube used: Ksanda gas discharge type (cf. C. J. Ksanda, "The Review of Scientific Instruments," vol. 3, No. 10, pp. 531–534, October 1932). Target: Copper giving K-alpha and K-beta radiation. Current: 39 kv., 5 milliamperes.

The following table enumerates the results obtained.

An analysis of the results obtained show that an X-ray rubber sheet prepared with lead titanate and containing the same amount of Pb per unit square as a lead sheet, possesses equal resistance to X-ray penetration. Furthermore, while the standard X-ray rubber (atomized lead) is nearly black in color, the X-ray rubber prepared with lead titanate according to the present invention has a pleasing light gray color.

The X-ray rubber of the present invention may be prepared in different color shades by tinting preferably with colored inorganic pigments. This is not possible in preparing X-ray rubber compositions containing black atomized lead or other reactive lead compounds which form black lead sulfide in the rubber compounding operation.

While in the foregoing we have described the preparation of X-ray rubber compositions containing pigmentary lead titanate because of the commercial availability of this compound, it will be obvious to those skilled in the art that where a still higher degree of nonreactivity is desired pure lead titanate may be used instead of the pigmentary type of lead titanate which usually contains about 7 percent lead sulfate.

Although in the foregoing we have particularly described X-ray absorbing rubber compositions containing lead titanate, it is to be understood that the comparatively nonreactive lead compounds of the present invention may be incorporated in other compositions which may be used to absorb X-rays such as plaster screens and the like.

We claim:

1. A light gray X-ray protective rubber composition comprising predominantly pigmentary lead titanate.

2. A light gray X-ray protective rubber composition containing between about 70% and about 90% by weight of pigmentary lead titanate.

3. A tinted X-ray protective rubber composition containing predominantly pigmentary lead titanate and a minor amount of a colored inorganic pigment.

Table

| Sample | Lead titanate in rubber, percent by weight | Pb in sheet, percent by weight | Pb in sheet, grams/cm.$^2$ | Resistance to X-ray penetration rating | Color of the X-ray rubber sheets |
|---|---|---|---|---|---|
| A | 73.0 | 49.9 | 0.285 | 6 | Light gray. |
| B | 80.2 | 55.0 | 0.396 | 5 | Do. |
| C | 84.5 | 57.8 | 0.453 | 3 | Do. |
| D | 87.2 | 59.6 | 0.572 | 2 | Do. |
| Commercial X-ray rubber | | 90.3 | 0.581 | 2 | Nearly black. |
| Sheet lead | | 100.0 | 0.720 | 1 | Do. |
| Do | | 100.0 | 0.576 | 2 | Do. |
| Do | | 100.0 | 0.432 | 4 | Do. |

DURANT W. ROBERTSON.
JOSEPH A. BRECKLEY.